United States Patent [19]

Joyner

[11] Patent Number: 4,797,670

[45] Date of Patent: Jan. 10, 1989

[54] REDUNDANT SIGNAL SELECTOR SYSTEM

[75] Inventor: Luther L. Joyner, Forest, Va.

[73] Assignee: Joyner Engineers & Trainers, Inc., Forest, Va.

[21] Appl. No.: 11,764

[22] Filed: Jan. 30, 1987

[51] Int. Cl.$^4$ .................. G05B 23/02; G08B 23/00
[52] U.S. Cl. .................. 340/825.170; 376/215; 340/508; 340/517
[58] Field of Search .................. 340/825.17, 507, 508, 340/661–663, 286 M, 825.01, 517, 870.04, 524, 525; 371/8, 68, 4, 14, 29, 67; 364/510, 146, 181, 184–187; 376/215–217, 450, 259; 328/116, 117, 147, 148; 307/360, 361, 219, 116, 117

[56] References Cited

U.S. PATENT DOCUMENTS

| | | | |
|---|---|---|---|
| 3,150,294 | 9/1964 | Dastidar | 361/186 |
| 3,431,557 | 3/1969 | Thomas et al. | 307/219 |
| 3,541,539 | 11/1970 | Trumble | 340/507 |
| 3,588,857 | 6/1971 | Gessner | 340/500 |
| 4,143,353 | 3/1979 | Schaible | 328/116 |
| 4,199,799 | 4/1980 | Ostenso et al. | 328/147 |
| 4,200,864 | 4/1980 | Gillet et al. | 376/215 |
| 4,215,340 | 7/1980 | Lejon | 340/507 |
| 4,414,540 | 11/1983 | Dickenson | 340/508 |
| 4,542,452 | 9/1985 | Fukai et al. | 364/141 |
| 4,594,714 | 6/1986 | Fischer et al. | 371/68 |
| 4,661,310 | 4/1987 | Cook et al. | 364/187 |

*Primary Examiner*—Donald J. Yusko
*Attorney, Agent, or Firm*—Burns, Doane, Swecker & Mathis

[57] ABSTRACT

The present invention relates to a signal selector which selects a signal for control of various operating parameters in a process facility. The system includes a display and first and second sensors each providing a signal representative of a single controlled parameter. The first signal is preferred as a control signal for the parameter. A switch is arranged on the display for manually selecting between the first and second signals or for selecting an automatic selection mode. The system further includes an arrangement for determining if the first signal is unacceptable including comparing the first and second signals to one another and to a first pre-selected threshold value and either by comparing the first signal to a second threshold value or performing a second comparison of the two signals. The system automatically switches to the second signal when the first signal is unacceptable when the switch is in the automatic selection mode. The display includes an indicator when it is determined that at least the first pre-selected threshold value has been exceeded.

41 Claims, 4 Drawing Sheets

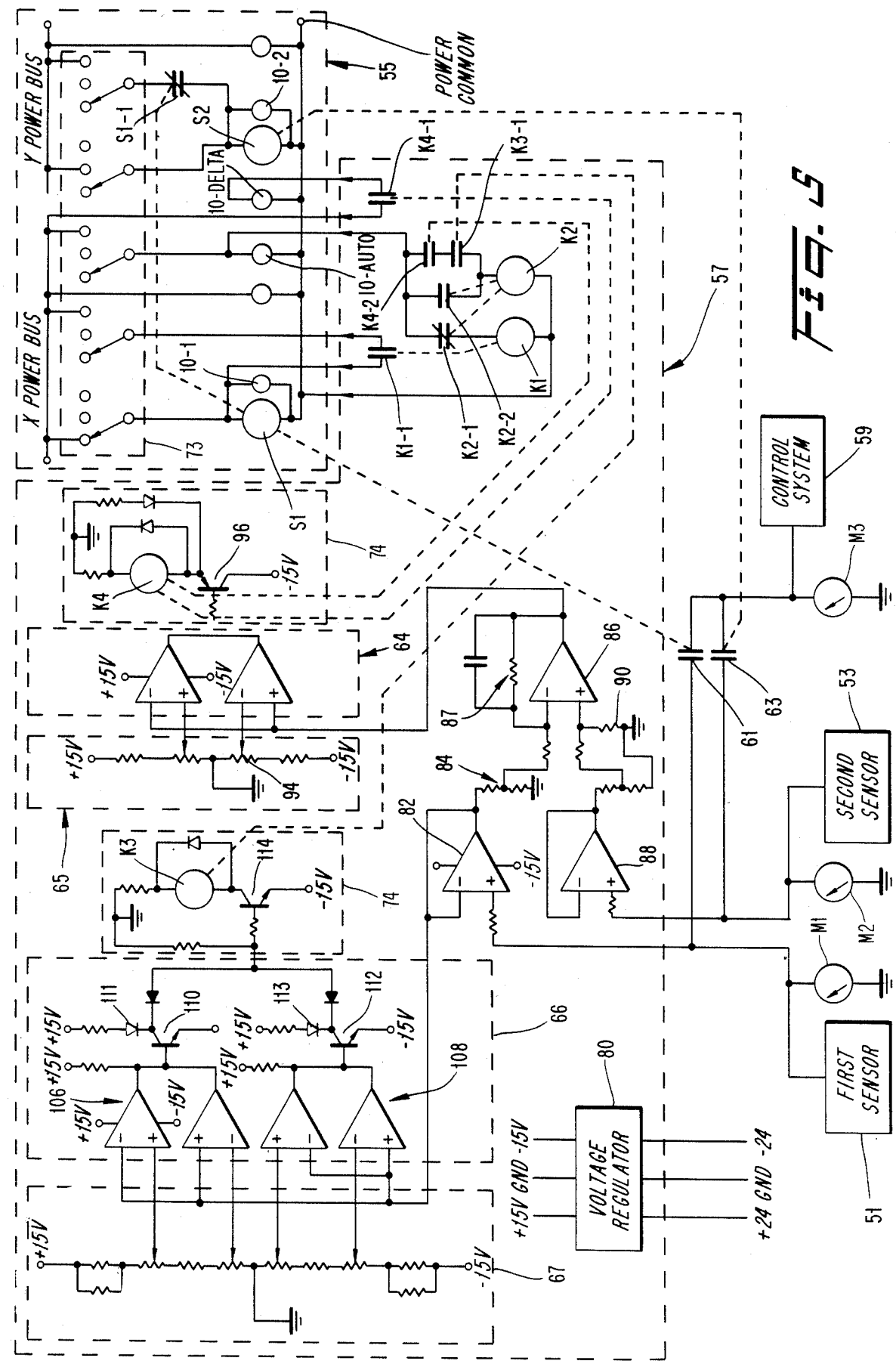

REDUNDANT SIGNAL SELECTOR SYSTEM

BACKGROUND OF THE INVENTION

The present invention relates to a signal selector system for selecting a signal for control of various parameters in a process facility. More particularly, the present invention pertains to automatic control systems in power plants and impooving reliability of signals which are generated as representative of various critical operating parameters and which serve as inputs to various control systems, for example, the feedwater control system or the pressure control system.

The signals which are used to control the various systems in, e.g., a nuclear power plant are generated by sensors (for example thermocouples, pressure sensors, etc.). The sensors continuously monitor the critical operating parameters of the nuclear power plant.

For example, if the signal from a pressure sensor fails and produces a "low" signal, i.e., a signal which is not indicative of the actual pressure, the control system receiving this signal would automatically take action to increase the pressure. Such an increase would not be appropriate to the actual conditions. Alternatively, the "low" signal could result in a false alarm causing a plant shut down. The shut down of a power plant for even a short period of time can cause an enormous economic loss to the plant and possible disruption of service to the public. In addition, it may be difficult to locate the source of the problem, i.e., the failed sensor, in the absence of additional indication to an operator of the source of the failure. A search for the problem area would likely cause additional, costly time delays. Regardless of the parameter under control, it is apparent that the reliability of the signals representing the measured quantity is of critical importance if the system is to be properly controlled.

One conventional method of improving control signal reliability is to use multiple redundant sensing devices, e.g., two or three sensors sensing the same parameter. An operator chooses between the redundant measurements via a switch on a console. Normally the operator selects one of the signals (called the preferred signal) for control. A back-up signal is generally used only if a problem or erroneous signal at the preferred signal is detected. However, this method requires constant supervision by the operator and the system is only as reliable as the operator. Other systems have been proposed where a back-up signal is automatically selected if the preferred signal falls outside a predetermined range. However, no indication that the back-up signal has been selected is generally provided to the operator.

Other types of signal detectors for other applications using automatic signal selection have also been proposed. For example, in U.S. Pat. No. 4,414,540 issued to Dickenson, an automatic signal selector is disclosed for selection of a valid signal representation of steam pressure for utilization by a turbine control system wherein steam pressure is a controlled parameter. Each pressure signal produced is applied to a corresponding range detection circuit which generates an alarm signal whenever the pressure signal is either higher or lower than corresponding pre-selected high and low point values representing maximum and minimum acceptable values of steam pressure. Based on the alarms, a signal within the acceptable range is automatically selected.

Also, U.S. Pat. No. 3,588,857 issued to Gessner discloses an automatic fail safe monitor wherein a signal corresponding to the difference between a pair of redundant signals is compared to a reference signal. If the difference exceeds a predetermined threshold, an alarm device is activated. The comparator has independent dual outputs so that in the event of a failure of one output, the other outputs function normally.

U.S. Pat. No. 3,431,557 issued to Thomas et al. and U.S. Pat. No. 4,200,864 issued to Gillet et al. disclose similar systems using redundant signals whereby the difference in the signal is compared to a threshold for attempting to determine a signal failure.

However, these patents do not disclose systems that are fully adequate to meet the needs of certain applications, for example, control systems in nuclear power plants. These prior systems are not fully suitable for all uses as they do not provide sufficient data to the operator to determine the operational state of the systems. For example, in systems that have only manual control by an operator, there is inadequate reliability because the system requires constant supervision. Also in previous systems, the operator has no clear indication of a signal problem and could switch to a bad channel. Likewise, in solely manual signal selecting systems, several rapidly developing transients will result if the preferred signal fails and the second back-up signal is not promptly selected. The plant may be shut-down before the operator has time to react.

The automatic signal selecting systems discussed above provide more reliability, but do not provide adequate means for automatically switching at an appropriate time and for giving an operator sufficient data to make an informed decision concerning the system being controlled. None of the previous systems discloses an automatic signal selector which compares the signals from two sensors to one another and to a first pre-selected threshold value and by either comparing the preferred signal to a pre-selected second threshold value or by performing an absolute comparison of the two signals to one another. The prior systems do not utilize a two-step comparison to determine whether the first preferred signal is acceptable, i.e., an accurate representation of the value of the controlled parameter. Nor do the automatic signal selector systems disclose an arrangement for allowing an operator to decide that the chosen signal is inappropriate and to switch to a back-up signal based on information he receives at the console.

OBJECTS AND BRIEF SUMMARY OF THE PRESENT INVENTION

Therefore, it is an object of the present invention to provide an improved signal selector system with greater reliability for providing control over the operating parameters of a process plant.

It is a further object of the present invention to provide a signal selector system that provides greater flexibility in operation than prior systems.

Still a further object of the present invention is to provide a signal selector system that automatically switches to a back-up signal when the primary signal is found to be unacceptable, i.e., not indicative of the value of the parameter being sensed.

Yet another object of the present invention is to provide a system that includes an arrangement for indicating to an operator the existence of a possibly faulty sensor or other problem with the sensed parameter prior to switching to the second, back-up signal.

Still another object of the present invention is to provide a signal selector system using two signal sensors for each parameter being controlled. The system allows an operator to select a automatic selection mode in which the signal selector automatically selects one of the signals, or to override the system and manually select one of the two signals as a control signal.

Still a further object of the present invention is to provide a signal selector system which is relatively inexpensive to produce and operate.

An additional object of the present invention is to provide a signal selector system which gives an operator unambiguous indication of the status of signals being sensed and which signal is being used for controlling the particular parameter of a process plant.

It is a further object of the invention to provide a signal selector system which provides a signal to the control system even when a power failure to the signal selector system has occurred.

Still a further object of the present invention is to provide a signal selector system which provides for automatic signal selection but has the flexibility to permit an operator to override the automatically selected signal based on information received from the system at a console.

Another object of the present invention is to provide a signal selector system which compares the first and second redundant signals to a pre-selected threshold value and determines if the redundant signals are outside the pre-selected threshold.

Yet another object of the present invention is to provide a signal selector system that utilizes a two-step comparison of two redundant signals to determine if a first, preferred signal is unacceptable and to thereby switch to the second, back-up signal.

These and other objects are accomplished by a signal selector system which selects a signal for control of various parameters in a process facility according to the present invention.

In accordance with one aspect of the present invention, first and second sensing means each provide a signal representative of a single controlled parameter with the first signal being preferred as a control signal for the parameter. A display includes a switch means on the display for manually selecting between the first and second signal, or for selecting an automatic selection mode. The invention further includes means for determining if the first signal is unacceptable by comparing the first and second signals to one another and to a first pre-selected threshold value and by either comparing the first signal to a pre-selected second threshold value or by performing a second comparison of the two signals to on another. The display also has means for indicating when the determining means decides that the first pre-selected threshold value has been exceeded.

In a first embodiment of the present invention, the first and second signals are compared to determine a difference value. The first threshold value is a pre-selected difference value and the second threshold value is a pre-selected range of acceptable values. Provided the difference in signals exceeds the first threshold and the first signal is outside the preselected range of acceptable value, the second signal is selected for control.

In a second embodiment of the present invention, the first and second signals are compared to determine a difference value. The first threshold is a pre-selected difference value. The second comparison of the first and second signals determines which signal is th larger. Provided the difference exceeds the first threshold, the smaller of the two signals is selected as the controlling signal.

In a third embodiment of the present invention, the first and second signals are compared to determine a difference value. The first threshold is a pre-selected difference value. The second comparison of the first and second signals determines which is the smaller. Provided the difference exceeds the first threshold, the larger of the two signals is selected.

In a fourth embodiment of the present invention, the first and second signals are compared to determine a difference value. The first threshold is a pre-selected difference value. The values of the first and second signals are each individually compared to a pre-selected second threshold value which may be internally or externally generated. Provided the difference exceeds the first threshold, either the first and second signal is selected for control, whichever is closest to the pre-selected second threshold.

In a fifth embodiment of the present invention, the first and second signals are compared to determine a difference value. The first threshold is a pre-selected difference value. The rate of change of both the first and second signals are also calculated and compared. Provided the difference in signals exceeds the first threshold, either the first or second signal is selected for control whichever has the smallest (or largest) rate of change.

In a sixth embodiment of the present invention, the first and second signals are compared to determine a difference value. The first threshold is a preselected difference value. The first signal is processed to determine the noise content of the first signal. The second threshold is a pre-selected range of acceptable noise values. Provided the difference in the first and second signals exceeds the first threshold, coincident with the noise content of the first signal exceeding the second threshold, the second signal is selected for control.

In accordance with a further aspect of the present invention, the system comprises two sensing means, each providing a signal representative of a single controlled parameter with the first signal being preferred for providing a control signal for the parameter. The system includes an automatic signal selector including means for determining the difference between the two signals, means for comparing the difference between the signals to a pre-selected threshold difference, and means for determining whether the preferred signal is outside of a pre-selected range. The system further includes means for indicating to an operator when the difference between the two signals is greater than the pre-selected threshold difference. The system also includes means for automatically switching to the second signal as the control signal, when the preferred and second signals differ by more than the pre-selected threshold and the preferred signal is outside of the pre-selected range. The system also includes means for indicating to an operator which signal is selected for control of the system. Further in a preferred embodiment, the system also includes means for indicating to the operator when the automatic mode of operation has been selected. Also, the system includes means for indicating to the operator when the difference between the two signals is greater than a pre-selected difference value.

In addition, the invention includes means for preventing a failure of a control system when a power failure occurs.

The present invention provides numerous advantages over previous redundant sensor systems. The invention is more reliable than previous systems because it provides an improved indication of the status of the redundant signals to an operator. The present invention compares the signals to each other and also to pre-selected threshold values. The automatic signal selector only switches to the second, non-preferred signal when two conditions are met. This arrangement prevents unwarranted switching when the first signal is indicative of the value of the sensed parameter.

Furthermore, the pre-selected thresholds can be varied to make the invention compatible with different control systems. The invention alerts an operator of possible impending problems before it is too late. Also, the invention is relatively inexpensive to installaand operate. The system of the present invention can be readily manufactured in a module readily insertable in existing standard cabinetry. Furthermore, the present invention requires only two sensors (normally already present) and only a few indicators on a console for an operator to fully apprise him of the operational condition of the system and to permit him to make intelligent decisions.

BRIEF DESCRIPTION OF THE DRAWINGS

The objects, advantages and features of the present invention will become apparent from the following detailed description of the preferred embodiment, when read with reference to the accompanying drawings, in which:

FIG. 5 is a diagram of one embodiment of the circuitry used in the signal selector system of the present invention.

DETAILED DESCRIPTION OF THE PREFERRED EMBODIMENT

The present invention is designed to be used in power plants to provide a signal for control of an operating parameter, for example, steam pressure. In order to ensure proper operation of the control systems in a nuclear power plant, the signal selected must be an accurate and reliable representation of the value of the actual parameter being controlled. For example, where steam pressure is the parameter being controlled, it is important to base control decisions on a correct measurement of steam pressure. Control decisions based on an incorrect measurement could result in a undesirable plant transient if the pressure is improperly increased or decreased to a critical level due to a faulty signal.

The present invention provides for reliable signal control by allowing an operator to select between two signals which represent a value for the same operating parameter to be controlled. The signals for controlling the various operating parameters are generated by sensors such as thermocouples, pressure sensors, or the like which continuously monitor the critical operating parameters of the nuclear power plant.

Figure 1:
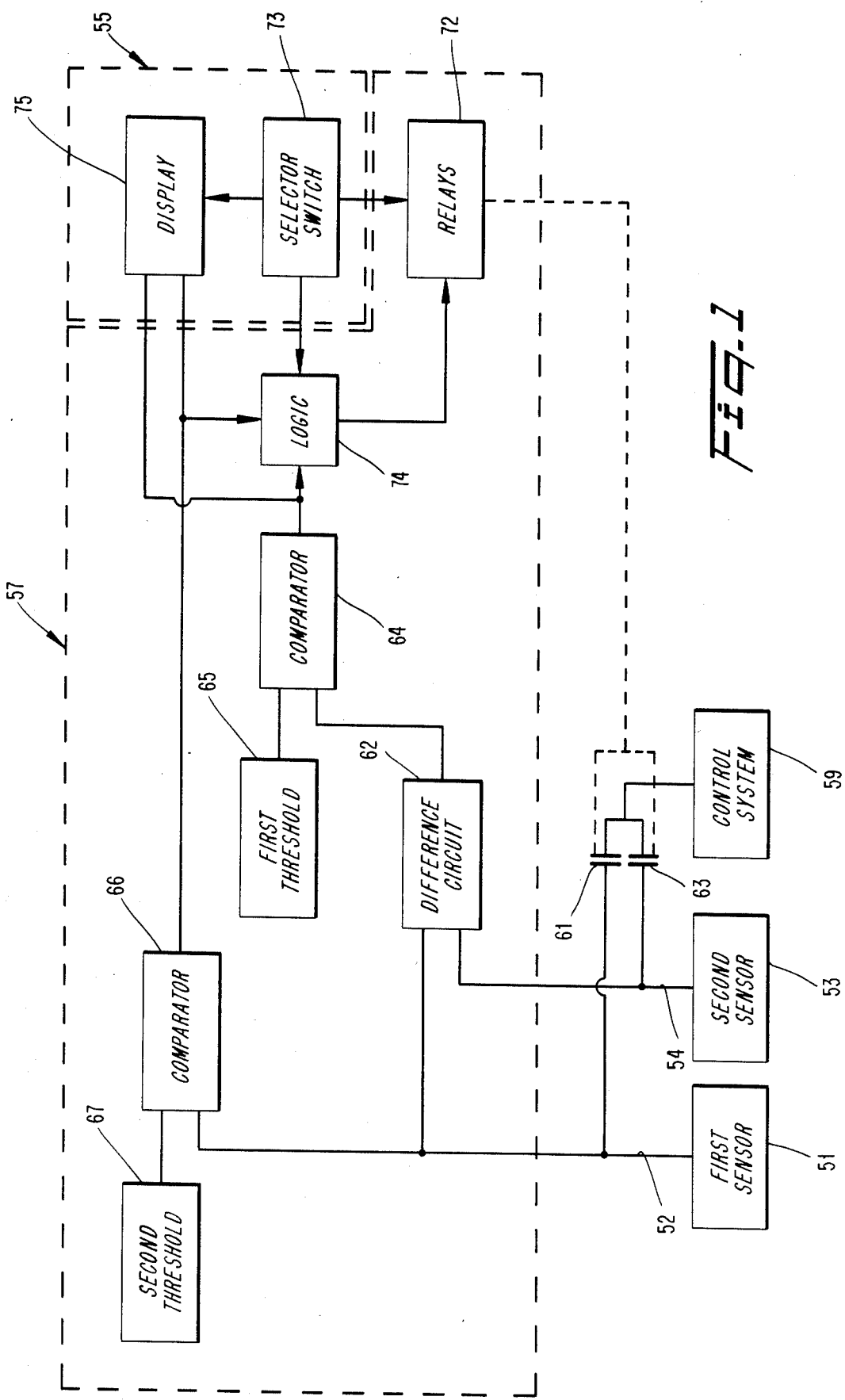
FIG. 1 is a schematic diagram of a first embodiment of a signal selector system according to the present invention.
Figure 2:
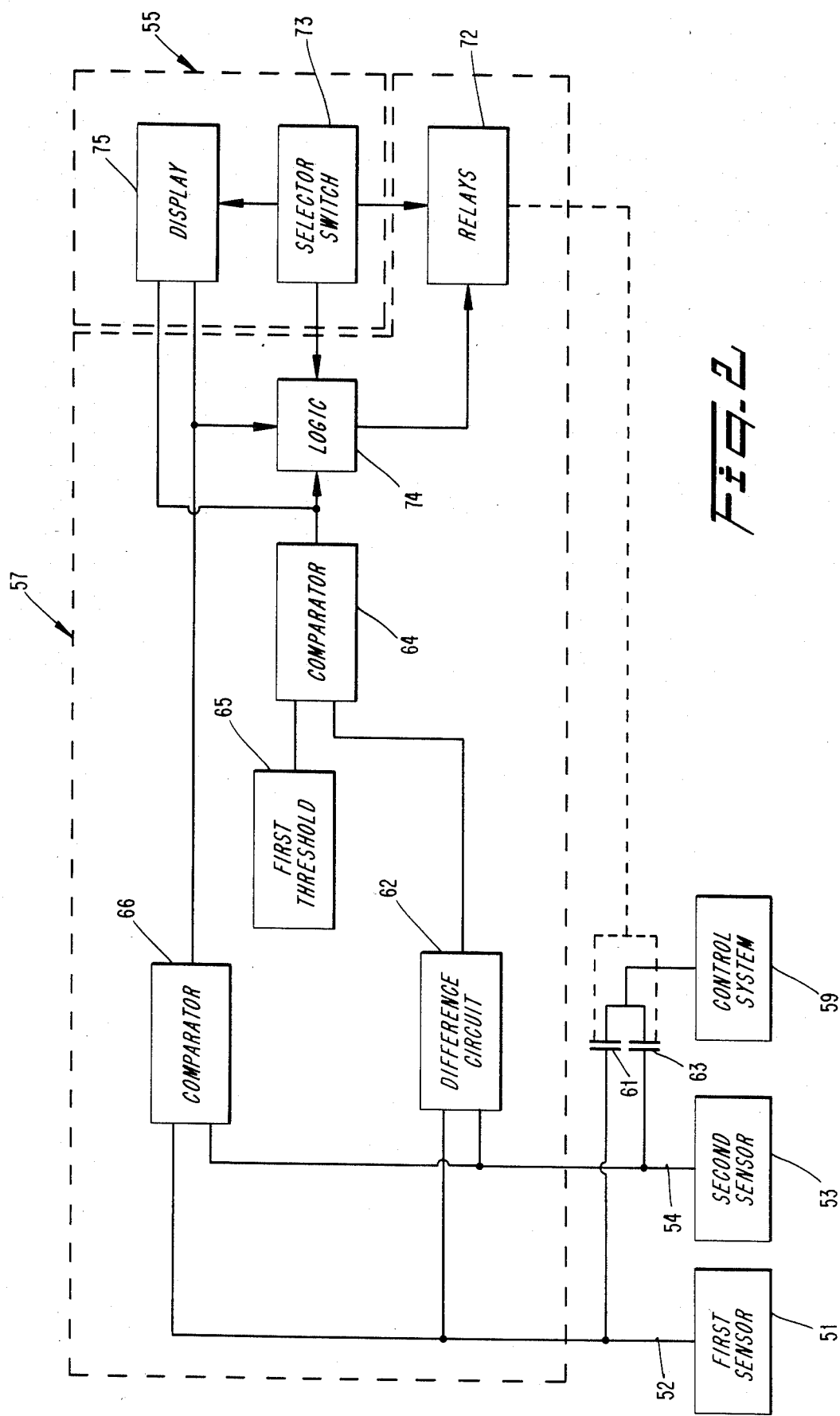
FIG. 2 is a schematic diagram of another embodiment of the signal selector system.

With reference to FIGS. 1 and 2, the invention includes first and second sensors 51, 53. The sensors 51, 53 provide first and second signals of the same parameter, one of which is selected for control of a particular operating parameter in the power plant.

The first and second signals are transmitted to a signal selector and comparator module 57 through lines 52 and 54, respectively. A switch and display console 55 is provided which allows an operator to select either the first signal or the second signal for system control. When the first signal is selected a first relay contact 61 is closed and a second relay contact 63 is open. When the second signal is selected then the relay contacts reverse The signal selector and comparator module 57 receives the first and second signals at its input and has circuitry for comparing the signals to each other and to predetermined threshold values.

With reference to FIG. 1, the signal selector and comparator module 57 includes a difference circuit 62 for determining the difference between the values derived from the first and second sensors 51, 53. To avoid unwanted transients in the difference that might be caused when the response of one sensor lags behind that of the other, the difference circuit can include a smoothing filter and thereby detect only a difference which exists for a significant period of time. The determined difference is supplied to a first comparator 64 which is supplied with a signal representing a first threshold, in this case, a pre-selected absolute difference signal. The output of the first comparator 64 indicates whether the absolute value of the determined difference is greater than the pre-selected threshold absolute difference. If the difference circuit 62 includes the smoothing filter, the first comparator 64 will not indicate that the pre-selected threshold has been exceeded if the difference between the signals was large for only a short period of time.

The signal selector and control module 57 of FIG. 1 also includes a second comparator 66 which receives a signal from the first sensor 51 and compares the value of the first signal to a second pre-selected range of values 67, called the second threshold. The output of the second comparator 66 indicates whether the first signal has exceeded the second threshold value, e.g., the first signal is outside of the pre-selected range of values.

The signal selector and control module 57 also includes a logic circuit 74 which receives the outputs of the first comparator 64 and the second comparator 66. The output of the logic circuit 74 indicates when the first and second signals differ by a significant amount coincident with the first signal being out of the pre-selected range of values.

A selector switch 73 has three modes. In mode 1, the first signal is selected by causing relays 72 to close a first relay contact 61 and open a second relay contact 63 thus sending the first signal to the control system 59. This selection of mode 1 also causes a display 75 to indicate that signal 1 is selected. In mode 2, the second signal is selected by causing relays 72 to close the second relay contact 63 and to open the first relay contact 61 thus sending the second signal to the control system 59. This selection of mode 2 also causes the display 75 to indicate that signal 2 is selected. In mode 3, the AUTO mode, the first signal is selected unless the logic circuit 74 indicates that a significant difference between the first signal and the second signal exists and that the first signal is outside the pre-selected range of values. In mode 3, the display 75 indicates that the AUTO mode is selected and also indicates which of the two signals has been selected for the control system 59.

The display 75 provides unambiguous indication to the operator of the system status by indicating the following: the status of the selector switch 73; the status of the first comparator 64; the status of the second comparator 66; and the status of the relays 72, i.e., which of the two signals is being provided to the control system 59.

In a second embodiment (FIG. 2), the signal selector and comparator module 57 includes the difference circuit 62 for comparing the values derived from the first and second sensors 51, 53 to each other. The determined difference is supplied to the first comparator 64 which is supplied with a signal representing a first threshold, in this case, a preselected difference signal. The output of the first comparator 64 indicates whether the value of the difference is greater than the pre-selected threshold difference.

Also, in the second embodiment the module 57 includes a second comparator 66 that performs second comparison of the values derived from the first and second sensors 51, 53 to each other. For example, in one embodiment, the output of the second comparator 66 indicates whether the first signal is greater than the second signal. The logic circuit 74 indicates when the first and second signals differ by more than a preselected amount coincident with the first signal being smaller than the second signal. In this case the second signal will be selected for control provided the selector switch is in the AUTO mode.

The signal selector and comparator module 57 sends signals from the first and second comparators 64, 66 to the switch and display console 55 which provides indications of the status of the signals. An operator is then able to make informed decisions concerning the proper selection of a preferred signal for system control.

Figure 3:
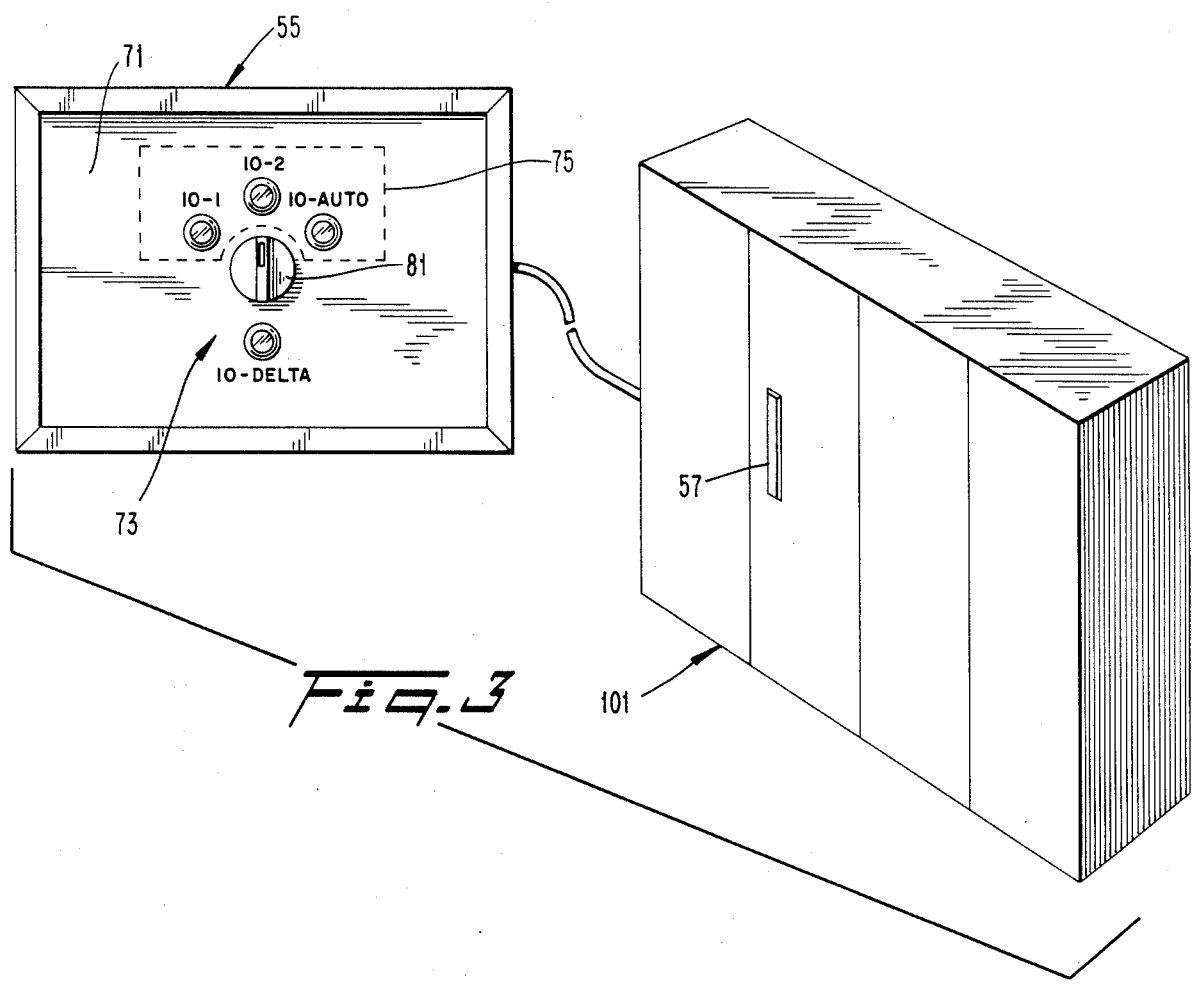
FIG. 3 is a schematic view of a display panel which is monitored by the operator and associated cabinetry.

With reference to FIG. 3, the switch 73 has three operating modes or positions: a first signal position, a second signal position and an "Auto" setting which places the system in an automatic selection mode. When an operator selects the "Auto" mode, the signal selector and comparator module 57 automatically selects the signal to be supplied to the control system 59. This signal is fed through the selector switch 73 to a relay actuator 72 that controls the relays 61, 63. The first signal is ordinarily selected by the signal selector and comparator module 57 as the preferred signal by closing relay contact 61. In practice, this automatic selection may be readily accomplished by employing a relay having one contact that is normally closed on the signal path of the first sensor 51. The signal selector and comparator module 57 automatically switches to the second signal as the selected control signal based on comparisons that are made of the signals. The module 57 makes certain comparisons to determine if the first signal is unacceptable, i.e., not representative of the value of the sensed parameter, in which case the second signal is selected.

The signal selector and comparator module 57 has the circuitry discussed above for making various comparisons of the signals. For example in the first embodiment, if the difference between the signals is greater than a predetermined acceptable value for some significant period of time (i.e., a "Delta" exists), the second, back-up signal will be selected as the control signal to the control system 59 if the first or primary signal is outside a pre-determined acceptable range. In other embodiments, module 57 may decide to switch to the back-up signal if the first signal is greater than the second signal and a "Delta" exists. In other embodiments, the module may switch to the back-up signal if the rate of change of the first signal is greater than the rate of change of the back-up signal (or the difference in the rate of change of the two signals exceeds a pre-selected rate of change value) and a "Delta" exists. Other comparisons can be performed by the module including switching to the back-up signal if the back-up signal is closer to some expected or desired value than the preferred signal.

In the preferred embodiments of the present invention, the module determines whether to switch to the back-up signal based on a combination of the comparisons that are made. These combinations of comparisons indicate with greater certainty that the first signal or preferred signal, from the sensor 1 is unacceptable. For example, the back-up may be selected if the difference between the preferred and back-up signals exceeds a predetermined threshold difference value and the preferred signal is outside a predetermined range of acceptable operating values. In another embodiment of the present invention (FIG. 2), the back-up may be selected if the difference between the preferred and backup signals exceeds a predetermined threshold difference value for a significant period and the preferred signal is greater than the backup signal.

By basing decisions on a combination of comparisons, the signal selector and comparator module 57 is able to make a more reliable decision about the selection of the proper signal. The signal selector and comparator module 57 sends signals to the switch and display console 55 which clearly indicate to the operator the results of the various comparisons done by the module 57. These signals provide indications which allow an operator to make informed decisions concerning the signal selection. The signal selection reliability is improved because the operator is given warning of any possible impending problems and can take appropriate action to solve any problems.

With reference to FIG. 3, a front of a display panel 71 is provided for monitoring the two signals by an operator. The front panel includes the switch 73 which allows an operator to select one of the signals for controlling various critical operating parameters in a nuclear power plant. Examples of the parameters to be controlled include the feedwater flow rate and the steam line pressure, among others.

With the display panel in FIG. 3, an operator can monitor the signal which is selected for control of the particular operating parameter. The operator may manually select either of the signals as the control signal or he may select the automatic selection mode through the switch 73, whereby circuitry, described previously, is provided for automatically selecting between the two signals as the control signal. The switch 73 has a selector knob 81 with three positions for selecting respectively the first signal, the second signal, or the automatic selection mode. Lights 10-1, 10-2 illuminate, indicating unambiguously to the operator if in fact the signal he has selected is being used to control a particular operating parameter. The auto light 10-Auto will glow if the "Auto" mode has been selected and whichever signal is selected by the signal selector module 57 will be indicated by light 10-1 or light 10-2.

Figure 4:
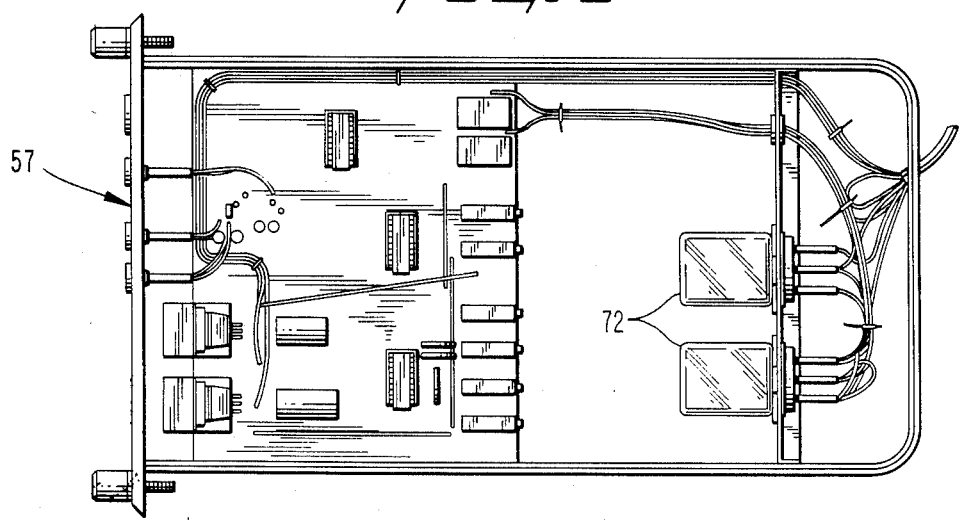
FIG. 4 is a view of the signal selector and comparator module which fits into the cabinetry of FIG. 3.

As shown in FIGS. 3 and 4, the signal selector and comparator module 57 circuitry (FIG. 4) for selecting between the two signals can be readily arranged in conventional circuit supports and frames 101 which can be readily installed in existing cabinetry as shown in FIG. 3. The signal selector and comparator module 57 fits into a standard recess in the circuit supports and frames 101. It is also possible to add additional indicator lights and/or meters to the display panel 71 and/or the selector and comparator module 57 if desired.

As noted previously, the first signal is unacceptable when it is not representative of the actual operating condition of a particular parameter being controlled. If the first signal falls outside this acceptable range, then an operator should be informed that critical control decisions are being made by the control system based on this unacceptable signal. Therefore, if the first signal is unacceptable, the back-up signal should be utilized. However, it is difficult to determine if the first signal is unacceptable if the first signal is merely "out-of-bounds". Accordingly, the present invention also determines if the difference between the two signals is also unacceptable. If the difference between signals is not unacceptable then the first or preferred signal is more likely a reasonably correct representation of the actual controlled parameter, and the first signal should be used for control purposes even though it is outside of a predetermined range. This situation may indicate that the actual controlled parameter is also outside the acceptable predetermined range and certain control functions should be performed to bring the controlled parameter within the acceptable range.

Accordingly, the present invention provides additional circuitry for comparing the two signals to a pre-selected threshold value. If the value derived from the comparison of the first and second signals exceeds the pre-selected threshold value, a light 10-delta will glow (FIG. 3). Such an exceeded value does not automatically cause switching to the second signal in accordance with the present invention unless the first signal exceeds a second pre-selected threshold value or the second comparison of the signals indicates the second signal should be used.

This operation is different from some previous signal selector systems where the back-up signal is automatically selected when the first signal is out of bounds. The second or backup signal may not be the best representation of the operating parameter especially if the first or preferred signal is close (i.e., the threshold difference has not been exceeded) therefore, it is appropriate to still select the first signal to be used as the control signal.

The operator knows that the pre-selected difference (or rate of change) between the first and second signals is not exceeded. Alternatively, if the threshold difference between the signals is exceeded and the light 10-delta is lit but the signal selector has not switched to the second signal, the operator knows additional information about the first signal depending upon the type of comparison made in the second comparator 66, for example, the first signal is not out of bounds. In either case, the operator has an indication of a possible problem and can investigate to locate any such problems and correct the situation before further complications occur.

The present invention gives improved reliability in signal selection because it simultaneously determines two relative conditions related to the two redundant signals, e.g., whether the first, preferred signal is out of bounds and whether the comparison of the two signals exceeds a pre-selected threshold value. In addition, an operator can monitor the signal selector process and provide additional fail-safe back-up, by overriding the automatic signal selector. Because of the indicators on the display panel, the operator always knows the status of the signals. The present invention provides a minimal amount of indicators, but provides a great deal of information to the operator. This information is particularly important because the same operator may be monitoring several different displays at the same time.

FIG. 5 shows one representative, typical circuitry of one embodiment of the signal selector system including the signal selector and comparator module. A voltage regulator 80 provides power to the various components of the signal selector system. The signal from the first sensor 51 is sent to the input of a buffer 82 through an isolation resistor. This buffer can comprise a unity gain amplifier. The signal from the first sensor 51 is also conveniently displayed on a meter M1. The output signal from the buffer passes through a voltage divider 84 to one input, i.e., the inverting input, of a differential amplifier 86 with a filter or feedback capacitor 87. In a preferred embodiment, the signal which is presented to the differential amplifier 86 from the voltage divider 84 is one-half the voltage of the signal from the sensor 51. The particular amount by which the signal is divide is suitably chosen in accordance with the output range of the sensor and the preferred range of input signals to the amplifier 86.

The second sensor 53 generates a second signal which passes through a similar buffer circuit 88 and a voltage divider 90, to the non-inverting input of the differential amplifier 86. The signal from the second sensor 53 is also conveniently displayed on a meter M2. The output signal of the amplifier is proportional to the difference between the first and second sensor signals. The amplifier includes an RC feedback network 87 which functions as a low pass filter in the Delta Circuit. This filter smooths out short-term transients in the difference signal which may be occasioned by differences in the response rate of the two sensors. The difference signal is sent to a window comparator circuit 64 which checks if the signal is less than or greater than a pre-selected threshold difference (delta). For example, the delta could be ±0.15 volts. Therefore the difference signal would be within the window if the difference signal was less than +0.15 volts and greater than −0.15 volts. The delta can be varied by variable resistors 94 within the window comparator circuit 64.

The output signal from the window comparator circuit 64 is presented to the base of a pnp transistor 96. This transistor is connected in series with the coil of a relay K4 to control its state of actuation. If the difference signal from the amplifier 86 is within the window, the output signal from the window comparator 64 will be "high" and the transistor 96 will not turn on. This will prevent the relay K4 from being energized. If the difference signal is not within the window then the output signal from the window comparator will be "low". The transistor 96 will then turn on and the relay K4 will be energized. When the relay K4 is energized its normally open relay contact K4-1 will close, causing a light 10-delta to illuminate. This indicates to an operator that the difference between the two sensor signals has exceeded the pre-selected delta and alerts the operator that there may be a problem.

The signal from the first sensor 51 is also sent from the buffer 82 to a limit detection circuit 66 (i.e., the second comparator 66). This circuit determines whether the sensor signal falls within one of two windows as determined by two pairs of differential amplifiers 106, 108. The sensor signal can be "out of bounds" by failing "high", "low", or "mid-scale". For example the first pair of amplifiers 106 could operate for a window of +0.2 volts to +9.8 volts. The second pair of amplifiers 108 could detect whether the signal falls within a window of −0.2 volts to −9.8 volts. These windows can also be adjusted with variable resistors respectively connected to one input terminal of each amplifier in the second threshold circuit 67. In the example above, the sensor signal would fail "high" if its value exceeded +9.8 volts. The sensor signal would fail "mid-scale" if its value was between −0.2 volts and +0.2 volts. Finally, the sensor signal would fail "low" if its value was below −9.8 volts. If the sensor signal is within one of the windows then the appropriate one of two corresponding transistors 110, 112 respectively connected to the pairs of amplifiers 106, 108 will be turned on. When either of the transistors 110 or 112 is turned on, it will cause a transistor 114 connected to the output terminal of the circuit 66 to be turned off. Also a corresponding light emitting diode 111 or 113 will be energized indicating the signal is within one of the acceptable windows. When the transistor 114 is turned off, the coil of a relay K3 connected in series with the transistor will be de-energized. However, when the sensor signal is "out of bounds" both transistors 110 and 112 will be turned off. This causes the transistor 114 to turn on and energize the relay K3.

By appropriate adjustment of the trimming resistors on the inputs of the amplifiers in the threshold circuit 67, the "out of bounds" values for "high" "low" and "mid-scale" failures can be changed as desired. For certain applications the "mid-scale" failure mode may be removed by appropriate modification of the circuitry in the comparator 66.

In the embodiment shown in FIG. 5, the selector switch 73 in the switch and display module 55 comprises a 5-pole, 3-position switch. In its first position, the left-most position shown in the figure, the switch connects a sensor control relay S1 to a power supply bus line to cause the relay to be actuated. When actuated, the relay closes the contacts 61 to connect the first sensor 51 to the control system. In addition, an indicator lamp 10-1 connected in parallel with the relay S1 will be energized, to indicate that the first sensor 51 is the operative one.

In a second position, the middle position shown in the figure, the switch disconnects the relay S1 from the power supply, thus causing the contacts 61 to open and the first sensor 51 to be disconnected from the control system. At the same time, the switch connects a second sensor control relay S2 to the power bus to actuate this relay. When actuated, this relay closes the contacts 63 to connect the second sensor 53 to the control system. Simultaneously, an indicator lamp 10-2 connected in parallel with the relay is energized to indicate that the second sensor 53 is being used. The signal actually connected to the control system is conveniently displayed on a meter M3.

In its third position, the auto mode position; the switch connects a relay K1 to the power supply bus, through a normally closed contact K2-1. It also energizes an indicator lamp 10-AUTO. Actuation of the relay K1 causes it to close a pair of contacts K1-1, which connect the relay S1 to the power supply bus. Thus, in the normal state, the relay S1 will be actuated to connect the first, or preferred, sensor 51 to the control system and the indicator lamp 10-1 will be energized. In addition, the actuated relay S1 will cause a pair of normally closed contacts S1-1 to be opened, thereby disconnecting the second sensor relay from the power bus.

As noted previously, when the difference between the two sensor signals exceeds the first threshold value, the relay K4 will be actuated. In addition to energizing the indicator lamp 10-delta to indicate that such a condition exists, the actuated relay will close a pair of contacts and contacts K4-2. Similarly, if the first sensor signal should go out-of-bounds (or if one of the alternative fault detection criteria is met), the relay K3 will be actuated. This relay will cause a pair of contacts K3-1, connected in series with the contacts K4-2, to close. If both of these pairs of contacts are closed at the same time, i.e., the difference between the two sensors exceeds the first threshold and the first sensor signal is, e.g., out of bounds, a relay K2 will be connected to the power bus to actuate it. When actuated, the relay K2 opens the contacts K2-1 to disconnect the relay K1 from the power bus. As a result, the contacts K1-1 are opened to deactuate the relay 51 and thereby disconnect the first sensor 51 from the control system. At the same time, the contact, S1-1 are closed to actuate the relay S2, and thereby connect the second sensor 53 to the control system and energize the lamp 10-2.

Thus, the relay contacts K3-1 and K4-2, together with the relays K1 and K2 and their associated contacts, function as a logic device (schematically illustrated as logic circuit 74 in FIGS. 1 and 2). This device operates in the auto mode to normally connect the preferred sensor to the control system and, if all of the fault criteria are met, to automatically switch to the backup sensor. In addition, the normally closed relay contacts S1-1 provide a power failure backup function. In the event that the supply of power to either of the relay S1 of K1 should be interrupted while the system is in the auto mode, the contacts S1-1 will automatically connect the relay S2 to th power bus to switch the backup sensor into the system.

The relay K2 includes a second set of contacts K2-2 which are connected in parallel with the contacts K4-2 and K3-1. Thus, once the relay K2 is actuated it will close the contacts K2-2 to maintain its state of actuation and keep the backup sensor in the system even if one of the fault signals, i.e., excessive delta or out-of-bounds, should no longer exist. Thus, once the system goes into the backup state because of the fault conditions, it can only be manually released from this state by actuation of the switch 73. Accordingly, the operator will be warned that a fault condition existed and a need for corrective action may be present.

The principles, preferred embodiments and mode of operation of the present invention have been described in the foregoing specification. However, the invention which is intended to be protected is not to be construed as limited to the particular embodiments disclosed. The embodiments are to be regarded a illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A signal selector system which selects a signal for control of various operating parameters in a process facility, comprising:
   a display;
   first and second sensing means each for providing a signal representative of a single controlled parameter, the first signal being preferred as a control signal for the parameter;
   switch means on said display for manually selecting between the first and second signals or for selecting an automatic selection mode;
   means for determining if said first signal is unacceptable including means for comparing said first and second signals to one another and to a first pre-selected threshold value and for comparing said first signal to a second threshold value;
   means for automatically switching to said second signal when said first signal is unacceptable when the switch means is in the automatic selection mode; and
   means on said display for indicating when said determining means indicates that at least the first pre-selected threshold value has been exceeded.

2. The signal selector system of claim 1, further comprising means on said display for indicating which of said signals has been manually selected by an operator or by said selector in the automatic selection mode.

3. The signal selector system of claim 1, further comprising means for preventing determination that the first signal is unacceptable when the first threshold has been exceeded for only a short period of time.

4. The signal selector system of claim 3, wherein the means for preventing determination includes a smoothing filter.

5. The signal selector system of claim 1, wherein the first and second signals are compared to determine a difference value, and said first threshold value is a pre-selected difference value and said second threshold value is a preselected range of values.

6. The signal selector system of claim 1, wherein the rate of change of the first and second values is compared to determine a difference in the rate of change, and said first threshold value is a pre-selected difference in the rate of change and said second threshold value is a pre-selected range of values.

7. The signal selector system of claim 1, wherein the first and second signals are each compared to a pre-selected desired signal, and the first threshold value is a pre-selected difference between the desired signal and each of the first and second signals, and the second threshold value is a pre-selected range of values.

8. The signal selector system of claim 1, wherein the first and second signals are compared to determine a difference value, said first threshold value is a pre-selected difference value, the noise content of the first signal is compared to said second threshold which is a pre-selected range of noise values.

9. The signal selector system of claim 1, further comprising means for ensuring delivering a control signal when said automatic signal selector fails.

10. The signal selector system of claim 1, further comprising means for automatically maintaining the second signal as the control signal after determining that the first signal was unacceptable.

11. A signal selector system which selects a signal for control of various operating parameters in a process facility, comprising:
    a display;
    first and second sensing means each for providing a signal representative of a single controlled parameter, the first signal being preferred as a control signal for the parameter;
    switch means on said display board for manually selecting between the first and second signals or for selecting an automatic selection mode;
    means for determining if said first signal is unacceptable including means for comparing said first and second signals to one another and to a first pre-selected threshold value and for performing a second comparison of said first and second signals to one another;
    means for automatically switching to said second signal when said first signal is unacceptable when the switch means is in the automatic selection mode; and
    means on said display for indicating when said determining means indicates that at least the first pre-selected threshold value has been exceeded.

12. The signal selector system of claim 11, wherein the first and second signals are compared to determine a difference value.

13. The signal selector system of claim 11, further comprising means for preventing determination that the first signal is unacceptable when the first threshold has been exceeded for only a short period of time.

14. The signal selector system of claim 11, wherein the first and second signals are compared to determine a difference value, said first threshold is a pre-selected difference value and the second comparison determines the smaller of the first and second signals.

15. The signal selector system of claim 11, wherein the first and second signals are compared to determine a difference value, said first threshold is a pre-selected difference value and the absolute comparison determines the larger of the first and second signals.

16. The signal selector system of claim 11, wherein the first and second signals are compared to determine a difference value, said first threshold is a pre-selected difference value and said second comparison determines the smaller rate of change of the first and second signals.

17. The signal selector system of claim 11, wherein the first and second signals are compared to determine a difference value, said first threshold is a pre-selected difference value and said second comparison determines the larger rate of change of the first and second signals.

18. The signal selector system of claim 11, wherein the first and second signals are compared to determine a difference value, said first threshold is a pre-selected difference value and the second comparison determines which signal is closer to a pre-selected desired value.

19. A signal selector system for selecting a signal for control of various parameters in a process facility, comprising:
    first and second sensing means each for providing a signal representative of a single controlled parameter, the signal from the first sensing means being preferred as the control signal of said parameter;
    an automatic signal selector, including means for determining a difference between said first and second signals, and means for comparing said difference to a pre-selected threshold difference, said automatic signal selector including means for determining whether said preferred signal is outside of a pre-selected acceptable range;

means for indicating to an operator when said difference between said signals is greater than said preselected threshold difference;

means for automatically switching to said second signal as the control signal, when both the preselected threshold difference has been exceeded and the preferred first signal is outside of said preselected acceptable range; and means for indicating to the operator which signal has been selected as the control signal.

20. The signal selector system of claim 19, further comprising means for overriding said means for automatically switching to said second signal including a switch for manually selecting between the first and second signals received from said sensors.

21. The signal selector of claim 20, wherein said signal selector includes first and second relays, said relays are selectively energized according to which signal has been selected, the first relay corresponding to said first signal and the second relay corresponding to said second signal.

22. The signal selector of claim 21, wherein the automatic switching means switches to said second signal when said first of said two relays fails by de-energization or switch power to the first relay fails low and de-energizes the first relay.

23. The signal selector of claim 20, further comprising means for ensuring delivery of a control signal when said automatic signal selector fails.

24. A signal selector system which selects a signal for control of various operating parameters in a process facility such as a power plant, comprising:
a display;
an automatic signal selector, connected to said display;
first and second sensing means for providing first and second signals electrically connected to said automatic signal selector, each of said sensing means providing a signal representative of a single controlled parameter, the first signal from said first sensor being preferred as the control signal of the parameter;
said automatic signal selector including means for determining the difference between said signals and comparing said difference to a pre-selected threshold difference, and means for determining whether said first signal is outside of a preselected acceptable range; said automatic signal selector automatically selecting said first signal unless said determining means indicates that both said difference between said first and second signals is greater than said pre-selected threshold difference and said first signal is outside said pre-selected range, wherein said second signal is selected as the control signal;
means on said display for manually selecting between said first and second signals, and an automatic selection mode, wherein the automatic signal selector automatically selects between said first and second signals;
means for indicating when said determining means indicates that said difference between said signals exceeds said preselected threshold difference;
means for preventing determination that the difference of said signals has exceeded the pre-selected threshold difference when said pre-selected threshold has been exceeded for only a short period of time.

means on said display for indicating to an operator which signal has been selected, either manually or automatically, as the control signal; and means for ensuring delivery of a control signal when said automatic signal selector fails.

25. A signal selector system which selects a control signal for control of an operating parameter in a process facility, comprising:
first and second sensing means for providing first and second signals representative of the operating parameter, the first signal being preferred as the control signal;
means for determining a difference between the first and second signals;
means for comparing the difference to a first preselected value and for comparing the first signal to a second preselected value; and
means for selecting the second signal as the control signal in response to both comparisons by the comparing means.

26. The signal selector of claim 25, wherein the second signal is selected as the control signal when the comparing means determines that the difference exceeds the first preselected value and the first signal is outside a predetermined range above and below the second preselected value.

27. The signal selector of claim 25, wherein the second signal is selected as the control signal when the comparing means determines that the difference is outside a first predetermined range above and below the first preselected value and the first signal is outside a second predetermined range above and below the second preselected value.

28. The signal selector of claim 25, wherein the second signal is selected when the comparing means determines that the difference exceeds the first preselected value and the first signal exceeds the second preselected value.

29. The signal selector of claim 25, further including means for smoothing the first and second signals.

30. The signal selector of claim 25, wherein the second preselected value is a rate of change and the comparing means compares the difference to a first preselected value and compares a rate of change of the first signal to the second preselected value.

31. The signal selector of claim 30, wherein the second signal is selected as the control signal when the comparing means determines that the difference exceeds the first preselected value and the rate of change of the first signal exceeds the second preselected value.

32. The signal selector of claim 30, wherein the second signal is selected as the control signal when the comparing means determines that the rate of change of the first signal exceeds the second preselected value and the difference is outside a predetermined range above and below the first preselected value.

33. The signal selector of claim 30, wherein the second signal is selected as the control signal when the comparing means determines that the difference is outside a first predetermined range above and below the first preselected value and the rate of change of the first signal is outside a second predetermined range above and below the second preselected value.

34. The signal selector of claim 30, further including means for smoothing the first and second signals.

35. The signal selector of claim 25, wherein the second preselected value is a noise content and the comparing means compares the difference to a first preselected value and compares a noise content of the first signal to the second preselected value.

36. The signal selector of claim 35, wherein the second signal is selectd as the control signal when the comparing means determines that the difference exceeds the first preselected value and the noise content of the first signal exceeds the second preselected value.

37. The signal selector of claim 35, wherein the second signal is selected as the control signal when the comparing means determines that the difference exceeds the first preselected value and the noise content of the first signal is less than the second preselected value.

38. A signal selector system which selects a control signal for control of an operating parameter in a process facility, comprising:
   first and second sensing means for providing first and second signals representative of the operating parameter, the first signal being preferred as the control signal;
   first means for comparing the first and second signals and for comparing a difference between the first and second signals to a preselected difference value;
   second means for comparing a rate of change of the first signal to a preselected rate of change value; and
   selector means for selecting the second signal as the control signal, the selector means being responsive to the first and second comparing means and the selector means selecting the second signal when the difference exceeds the preselected difference value and the rate of change exceeds the preselected rate of change value.

39. The signal selector of claim 38, wherein the second signal is selected as the control signal when the rate of change of the first signal exceeds the preselected rate of change value and the difference is outside a predetermined range above and below the preselected difference value.

40. The signal selector of claim 38, wherein the second signal is selected as the control signal when the difference is outside a first predetermined range above and below the preselected difference value and the rate of change of the first signal is outside a second predetermined range above and below the preselected rate of change value.

41. The signal selector of claim 38, further including means for smoothing the first and second signals.

* * * * *